United States Patent
Warnaka et al.

[11] Patent Number: 5,835,608
[45] Date of Patent: Nov. 10, 1998

[54] SIGNAL SEPARATING SYSTEM

[75] Inventors: Glenn E. Warnaka; Francis J. Driscoll, both of State College, Pa.

[73] Assignee: Applied Acoustic Research

[21] Appl. No.: 500,446

[22] Filed: Jul. 10, 1995

[51] Int. Cl.[6] .............................. H04B 15/00; H04R 3/00
[52] U.S. Cl. ........................ 381/94.7; 381/71.1; 381/92
[58] Field of Search ............................ 381/71, 94, 73.1, 381/26, 92, 83, 93

[56] References Cited

U.S. PATENT DOCUMENTS

| | | | |
|---|---|---|---|
| 5,381,473 | 1/1995 | Andrea | 381/71 |
| 5,452,361 | 9/1995 | Jones | 381/71 |
| 5,473,684 | 12/1995 | Bartlett | 381/71 |
| 5,473,702 | 12/1995 | Yoshida | 381/71 |

FOREIGN PATENT DOCUMENTS 0545731  6/1993  European Pat. Off. ................. 381/94

OTHER PUBLICATIONS

Widrow et al., "Adaptive Noise Cancelling, Principles & Applications", (Proceedings of the IEEE), vol. 63, No. 12, Dec. 1975, pp. 1–25.

Widrow et al, "Adaptive Noise Cancelling: Principles + Applications" (Proceedings of the IEEE), vol. 63, No. 12, Dec. 1975, pp. 1–25.

*Primary Examiner*—Wing F. Chan
*Assistant Examiner*—Xu Mei

[57] ABSTRACT

The present invention relates to a sound separating system for separating signals such as intelligible sound, for example, speech, from unwanted noise, such as random noise, when both the noise and the intelligible speech sound are present in an acoustical field and the intelligible speech sound is provided from a source located within the acoustical field. The system comprises a first and second sensing transducer located within the field which both pick up both the intelligible speech sound and the noise. Each sensing transducer generates a representative output signal. The two sensing transducer are in close proximity to each other and the intelligible sound is correlated at said first and second sensing means relative to the sound's source.

14 Claims, 3 Drawing Sheets

SIGNAL SEPARATING SYSTEM

BACKGROUND OF THE INVENTION

This invention relates to the separation of desired signals from unwanted background interference. In one embodiment, this invention relates to the separation of intelligible audio signals, e.g., speech sound, from unwanted background noise when both are located within an acoustical field.

U.S. Pat. No. 5,046,103, assigned to the same assignee as the present invention, relates to a system for attenuating unwanted noise from speech sounds when both are located within an acoustic field. The system relates to a method of electronically attenuating, i.e. canceling, unwanted noise so that substantially only the desired speech sound is reproduced in an audio reproduction system. The system of said U.S. Pat. No. 5,046,103 utilizes placing a conventional voice microphone in a non-critical spaced relation to a source of intelligible sound while the microphone is exposed to an acoustic field of unwanted ambient noise. The microphone electrically transmits output signals attenuated under control of a signal processing controller to which a sampled input of noise signals is fed by a reference microphone which is exposed to the same acoustical noise field as the voice microphone for audio reproduction of the speech sound without background noise by the programming of the controller to cancel the unwanted ambient noise.

The present invention employs a very different method of separating intelligible audio signals from unwanted random noise which does not rely on canceling the random noise but rather relies on correlating the intelligible signals and thereafter separating such from the unwanted random noise. As a unique part of the present system, a summing means is utilized in a completely different manner than in previous prior art systems in that such a summing means is utilized to cancel the intelligible signals to generate an error signal, rather than being utilized to cancel any undesired signals. The present invention may also be adapted to separate desired intelligible signals other than audio signals from unwanted background interference or distortion.

BRIEF DESCRIPTION OF THE DRAWINGS

The features of the present invention will become apparent from the following description taken in conjunction with the preferred embodiments thereof with reference to the accompanying drawings wherein.

SUMMARY OF THE INVENTION

Figure 1:
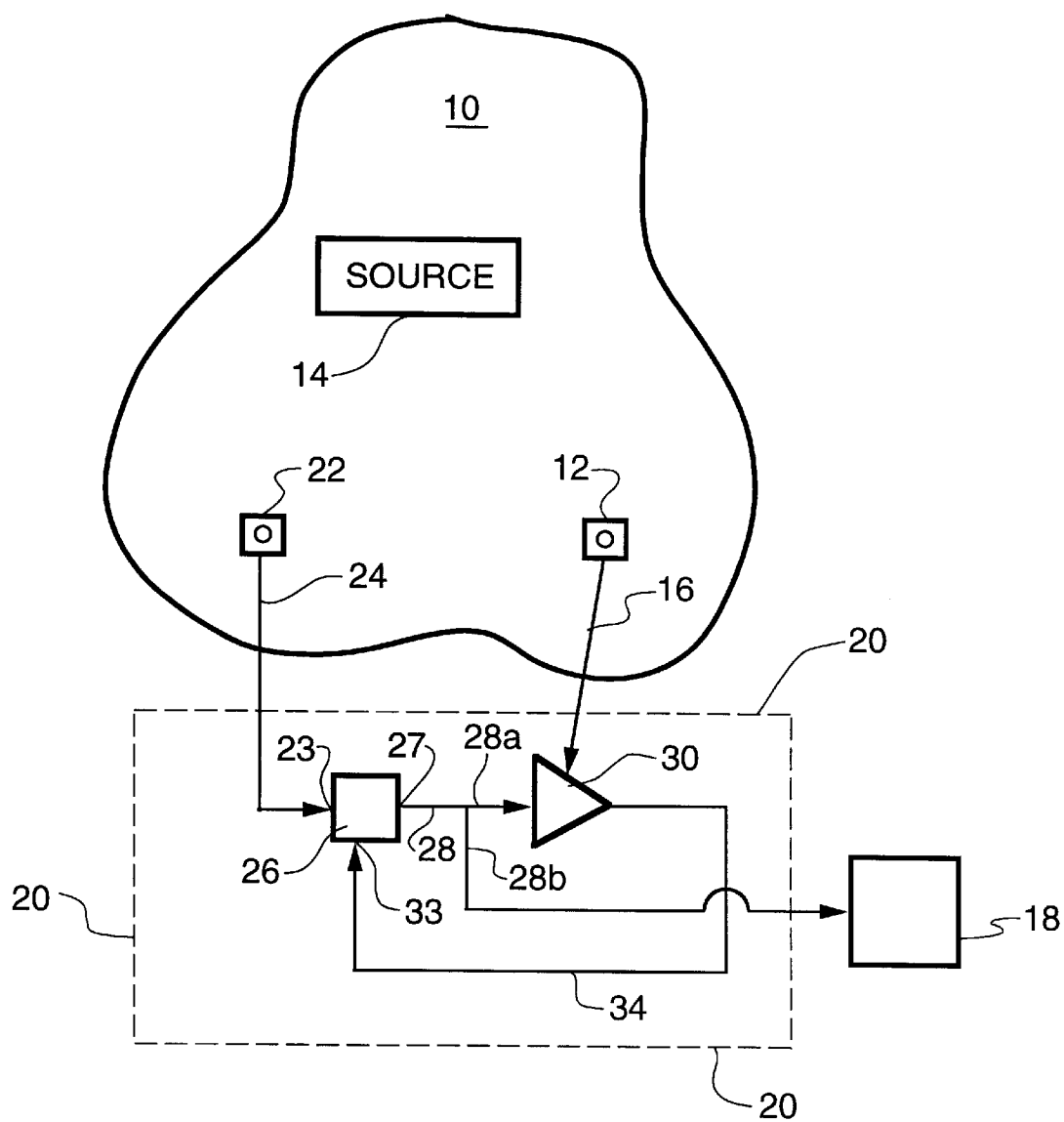
FIG. 1 is a schematic illustration and simplified circuit diagram illustrating the separating system of the present invention in accordance with one embodiment.

The present invention utilizes the discovery that intelligible signals that are correlated at two distinct receivers will also be correlated relative to the source of the signals, and that such correlated intelligible signals can be separated from unwanted background noise or distortion. Such unwanted noise, which at times is referred to herein as "random" noise, is, in effect, all background noise (or other signals if the system of the present invention is used to separate other than audio signals) that interferes with the desired signal. The unwanted background signal may consist of, for example, tonal and/or harmonic noise generated by various machinery (motors, blowers, fans, office machines, etc.), random noise (other unwanted speech, i.e. "babble", air moving noise, street noise, etc.) and transient noise (telephone ringing, hand claps, backfires, thunder claps, etc.). The present invention utilizes in part the discovery that if a signal, such as an audio signal, is spatially correlated or coherent at two separate locations then the signal at these two locations will be closely coupled to the source signal. Conversely, when the signal at two locations is poorly coupled or not coupled at all to the source signal the two locations are determined to be incoherent or uncorrelated relative to the source signal. Generally most sounds, and in particular random noise, are incoherent at two separate locations if they are measured far from their source. This is caused in part because the sounds will generally take very different paths to the two locations, and thus will be reflected or scattered in different ways as they travel on such paths and will often arrive at the destinations at somewhat different times.

With particular reference to intelligible sound, the present invention takes advantage of the correlation/coherence principles set forth above by serving to place two microphones near enough to a source of intelligible sound, such as a speaker, so that the speaker's voice will reach the microphones in a highly correlated manner or with high coherence with little or no reflection, or, if the sounds are reflected, they will follow the same pathway to both microphones. Essentially, the speaker's voice will reach both microphones substantially simultaneously, or it may arrive at the microphone(s) connected to the adaptive filter (i.e., signal processing means as described below) before it arrives at the microphone(s) connected to the summing means.

It has been unexpectedly discovered that excellent separation of intelligible noise from unwanted noise can be achieved, even in a noise field that contains a great deal of unwanted and varied noise, not by canceling the unwanted random noise, but by separating the correlated noise from the uncorrelated random background noise and transmitting a signal representing only the correlated noise to a standard voice reproduction system.

The present invention is in part directed to a method of separating intelligible sound from unwanted random noise and reproducing the intelligible sound essentially independent of the random noise, when both the intelligible sound and the random noise are present within an acoustic noise field within which there is located the source of the intelligible sound. The method of this embodiment of the present invention comprises positioning two separate sensing means within the acoustic field. The two sensing means are located at a distance from each other and the source such that sound from the source will be highly correlated or coherent at each location. Each sensing means will thereafter generate an output signal representative of the intelligible sound and the random noise. The output signals from each sensing means are directed to a noise separation means, which generates a noise cancellation signal representative of the intelligible sound separated from the random noise. The thus-generated signal is directed to an audio reproduction means such as a loudspeaker.

In a basic embodiment, the present invention is directed to a method of treating at least two source output signals, each containing a desired signal fraction and an unwanted signal fraction, said desired signal fractions each being correlated with the original source of said desired signal fraction, such as, for example, the original voice source. The method essentially comprises directing one of the source output signals to a signal processing means for separating the desired signal fraction from the unwanted signal fraction. The signal processing means will also receive as input a feedback error input signal, and will generate a output signal which is computed according to a suitable algorithm. This signal processing means output signal will be representative of the desired signal fraction separated from the unwanted signal fraction. The signal processing means output signal will be separated into two identical signals, one of which will be directed into a summing means and the other of which will be directed to a suitable signal reduction unit. The summing means will also receive as input one of the source output signals. The summing means will serve to cancel out the desired signal fraction, leaving the feedback error signal referenced above which is directed to the signal processing means.

DETAILED DESCRIPTION OF THE PREFERRED EMBODIMENT

Referring now to FIG. 1, there is schematically depicted an acoustical field generally referred to by the reference numeral 10 in which a first sensing device means 12, which essentially is a voice microphone, is located through which acoustical wave signals are sensed in a manner well known in the art. Accordingly, the first sensing device 12 is adapted primarily to pick up intelligible speech source from a source 14 of said sounds that is located within the acoustical field 10, such as the speech sounds emitted by a person. Thus the speech sound from source 14 picked up by the voice microphone 12 is converted into an electrical signal conducted by signal line 16. First sensing device 12 will also pick up at least a certain amount of random noise that is located within the acoustical field 10, whether or not the source of any of said random noise is located within acoustical field 10. The random noise will therefore represent a component of the electrical signal that is transmitted by the signal line 16. The voice microphone 12 is also coupled by means of its signal line 16 to a noise separating system 20 in accordance with the present invention. Also coupled to said noise separating system by signal line 24 is second sensing means 22, which basically is also a conventional type of microphone, and which is also located within the acoustical noise field 10. Microphone 22 is located in close proximity to microphone 12 so that the intelligible sound from source 14 is correlated at said first and second sensing means 12 and 22 relative to source 14. Thus the speech sound from source 14, and any random noise located within the acoustical field, will be picked up by the voice microphone 22 and converted into an electrical signal, containing both intelligible and random sound components, which is then conducted by signal line 24. Thus, relative to the two microphones, the intelligible speech sound from source 14 will be highly correlated, but the random noise separately picked up by both microphones 12 and 22 will be uncorrelated.

In general, speech or other desired signals will be correlated, or coherent, between two microphones as long as the speech arrives at both microphones simultaneously or nearly simultaneously. This is most easily accomplished by placing the microphones equidistant from the speaker. In this case the sound comes directly from the speaker to the microphones without reflections or reverberation, and the sound of the speaker will arrive at each microphone at essentially the same time. Unwanted background noise, however, will arrive at the two microphones at different times because of reflections and reverberation, and, therefore, it will not be correlated or coherent.

Other arrangements of microphones are also possible in which the speech does not arrive simultaneously at both microphones. In this case, it is also possible to "balance" the system in the case where the speech arrives at the two microphones at different times. This can be accomplished, for example, by adding a delay line into the circuit after the microphone that receives the first arrival of the speech. The delay time chosen should be such that the signals from both microphones arrive substantially simultaneously for processing.

For cases where it desirable for the microphones to be close to the speaker, as in a broadcast newsroom, the microphones can advantageously be placed quite close together, 2 to 4 inches, for example. For hands-free car telephone use, the microphones must be farther from the speaker and may be separated by eighteen (18) inches or more and placed in the car overhead or on the windshield visor. In most cases, practical considerations dictate that the microphones be placed fairly close, within a few feet or less, to the speaker or source.

In accordance with one embodiment of the invention as depicted in FIG. 1, the noise separation system 20 involves electronic separation of the intelligible pattern by use of an adaptive signal processor 26 and a summing means 30.

Signal line 24 from microphone 22 is connected to adaptive signal processor 26 at one signal sampling input terminal 23. The electrical signal from the output terminal 27 of processor 26, which basically represents the separated intelligible pattern. In prior art systems such a signal that is emitted from an adaptive signal processor represents an "unwanted noise" signal that has been converted into a noise cancellation signal. As depicted in FIG. 1, the signal is directed into signal line 28, whereupon it is split into two identical signals. One such signal is connected by signal line 28a to one input of a summing amplifier means 30, which summing amplifier means 30 has another input to which the input signal line 16 from voice microphone 12 is connected. In the summing means 30 the combination of the electrical signal from the output terminal 27 of processor 26, which is converted in said summing means to an intelligible signal, and that portion of the signal from sensing means 12 which represents the intelligible signal will cancel each other, leaving only an error signal which is representative of the unwanted random noise portion of the signal from microphone 22. The error signal is directed back into error input terminal 33 of adaptive processor 26 via signal line 34. Inside signal processor 26 the error signal will be compared to the reference signal from microphone 22 to thereby influence, by programmed operation, the output of signal processor 26. During each cycle of operation, the signal processor 26, which will typically operate at a high speed, readapts itself and improves the filtration of the desired signal. The end result of using the error signal to adjust the output signal from the signal processing means 26 will be that the output signal will more closely represent the intelligible sound without, i.e. separated from, the random noise. The other identical signal split off of signal line 28 is connected by signal line 28b to an audio reproducing system 18 of any suitable and well known type.

Adaptive signal processors of the type 26 depicted in the Figure are already known as disclosed, for example, in U.S. Pat. No. 4,473,906.

The electronic controller 26 as shown in FIG. 1 is programmed in accordance with an adaptive algorithm as disclosed in U.S. Pat. No. 4,473,906. In the present invention, any adaptive algorithm, such as a modified deterministic algorithm or any suitable algorithm for signal cancellation may be used in the signal processing controller 26 is based on the correlation between the intelligible sources and the output of the signal processing controller 26 will represent the separated intelligible signal.

The system of the present invention to separate correlated intelligible sound from random noise is adaptive to many uses. For example, it may be utilized in the broadcasting industry, wherein one possible configuration of the microphones would be to place two miniature microphones in a close relationship, such as on a pin on the lapel of the speaker. The system may also be used, for example, in conjunction with a cellular phone system in an automobile, such as by placing the microphones relatively close together on a car's sun visor. The two microphones can also be placed in environments such as oxygen masks and helmets, to name just two possibilities. In another embodiment of the present invention, one or more of the sensing means can be comprised of an array of microphones closely located to each other.

As indicated, the system of the present invention may be used to separate other types of intelligible signals from background distortion. For example, electromagnetic signals (such as telephone communication, video, etc.) transmitted from a satellite to the ground will pass through an interference or distortion "field", which may consist of space, solid matter, and/or the atmosphere, all of which may cause various kinds of distortion to the signal. However, if two different sensors, e.g. antennae, are used, the desired intelligible signal will be the same, i.e. coherent, for both sensors or antennae, but, if the sensors or antennae are in somewhat different locations, the distortion of the desired intelligible signals will be different for each sensor, since the path traveled by the signals to each sensor will be different. Hence, while the intelligible signal is coherent at each location the distortion will not be coherent, and the concepts described above can be used to separate the desired signal from the distortion, which can be comprised of random noise, electromagnetic interference, and so forth. For such electromagnetic signals the device set forth in the drawing of FIG. 1 can be utilized to effect such a separation, with the exception that there would be no acoustical field per se as represented by the numeral 10. Moreover, because of the speed at which electromagnetic signals travel sensing means 12 and 22 can be placed much further apart from each other than is the case for audio signals, with the intelligible signals still being coherent at each such spaced location.

In the case where transducers are at a great distance from the source, as in the case of satellite telephone or video communication, the receiving antennae may be at different distances. In this case, the signals will arrive at the antennae at different times. The time differences between the two antennae may be balanced by adding a delay line to the antennae with the shortest signal arrival time so that the total time represented by the signal travel time plus the time delay of the delay line equals the signal travel time of the antenna farther from he source and with the longer signal travel time.

Figure 2:
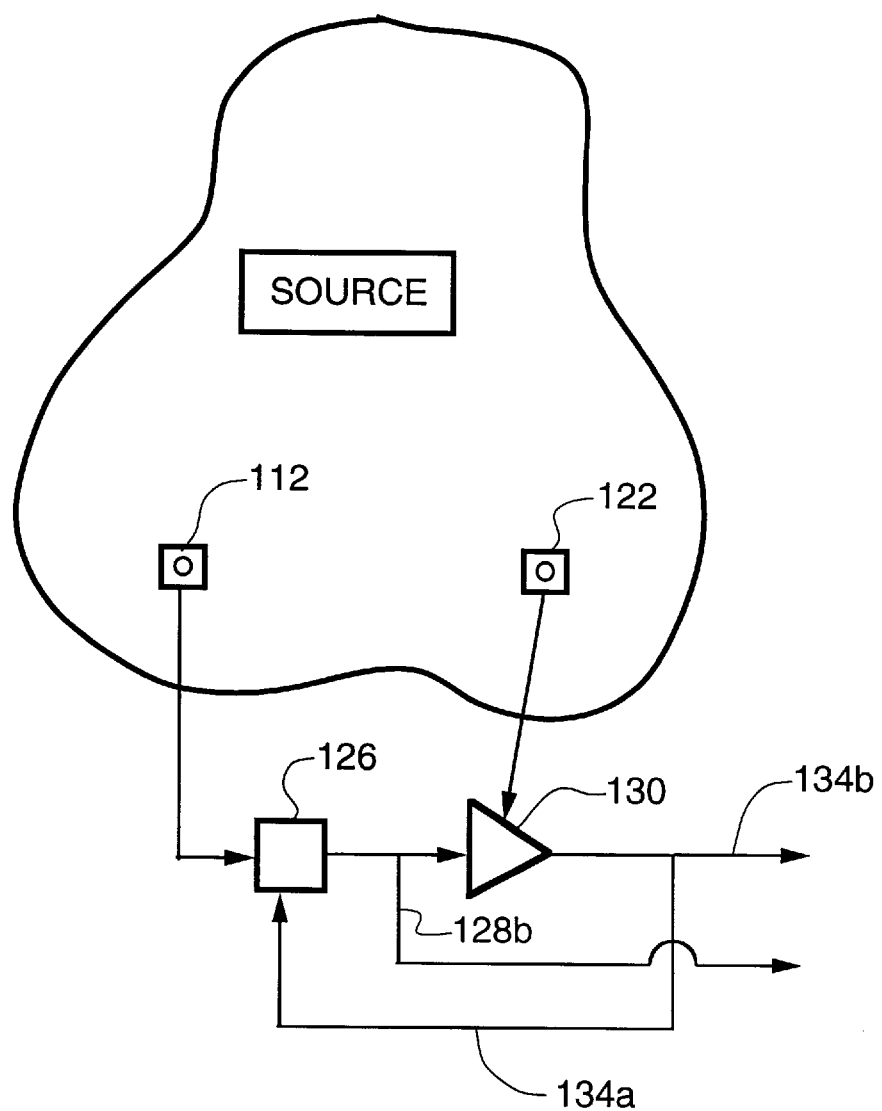
FIG. 2 is a schematic illustration and simplified circuit diagram illustrating the separating system of the present invention in accordance with another embodiment.

In another embodiment of the present invention, two separate signals may be separated from one another and each may be thereafter canceled. For example, interior car noise is typically caused by more than one source. Therefore, a more effective way of controlling noise inside an automobile would be to first separate the different types of noise signals from one another, as they may each be subject to different kinds of active noise and vibration control treatment. In order to achieve this separation of signals, the microphones 112 and 122 depicted in FIG. 2 are positioned close to the source of the sound that will be correlated, such as, for example, power train noise. As in FIG. 1, the output signal from processor 126 is split into two identical signals, both of which represent correlated signals, with a separated correlated signal being generated on line 128b in the same manner as described above relative to FIG. 1. Unlike the system of FIG. 1, the signal output from summing means 130 will also be split into two identical signals, with one system being directed into line 134a, which is the error signal that is sent back to processor 126, and the other identical signal representing the separated uncorrelated noise or vibration being generated on line 134b. Both the signals of lines 128b and 134b may be used for noise and/or vibration control.

Figure 3:
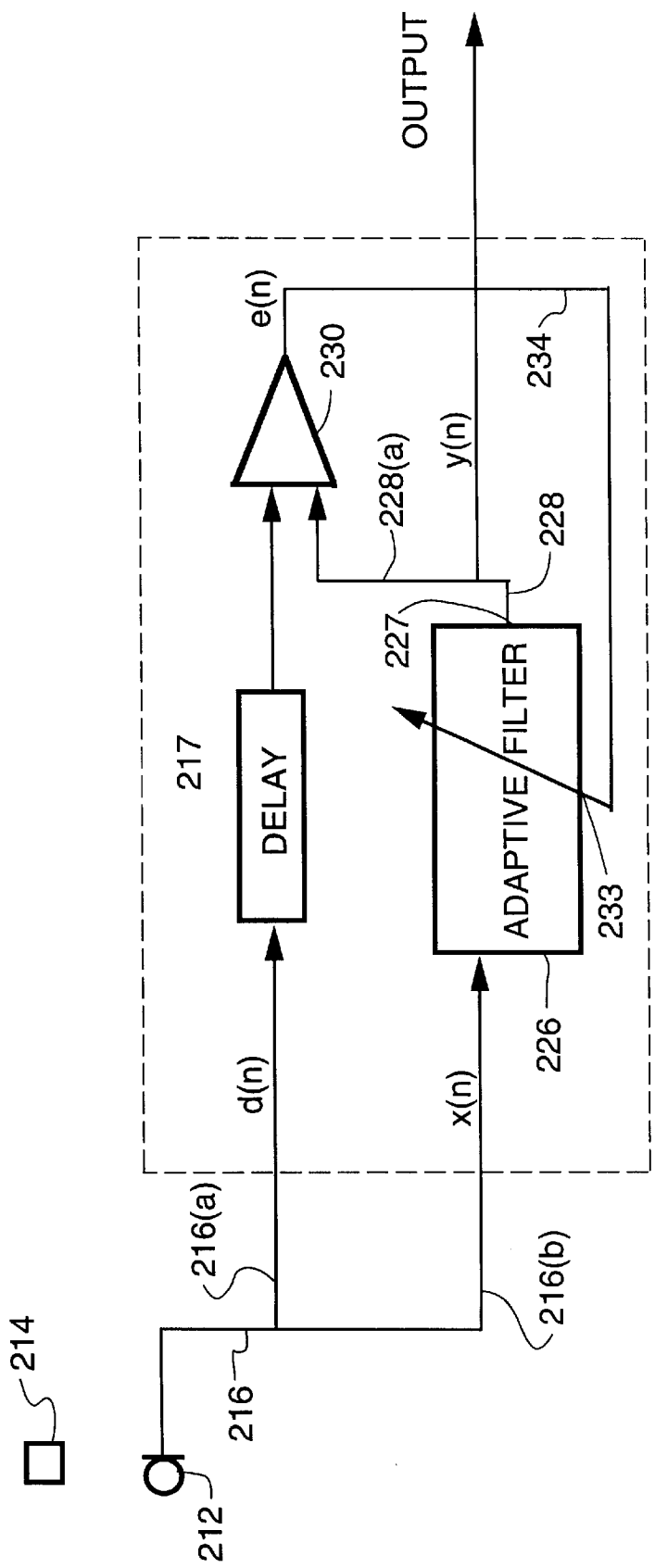
FIG. 3 is a schematic illustration and simplified circuit diagram illustrating the separating system of the present invention in accordance with another embodiment wherein a single microphone is utilized in the system.

FIG. 3 depicts a variation of the present invention wherein a single "sensing means", i.e., a microphone, can be used to separate correlated (desired, such as voice communication) from incoherent (not desired, such as unwanted environmental noise) sounds according to the principles of the present invention. According to FIG. 3, sensing device 212 is adapted primarily to pick up intelligible speech source from a source 214 of said sounds. Noise sensing device 212 will also pick up any incoherent background noise which will therefore represent a component of the electrical signal that is transmitted by the signal line 216. Signal line 216 is separated into two identical signals, 216a and 216b, with the output of each being represented, respectively, by the terms $d(n)$ and $x(n)$. It is clear that $d(n)=x(n)$, since the output of the microphone must be identical for both sides of the circuit. Delay block 217 is shown in the upper side of the circuit. The purpose of this delay is to ensure that the electronic signals reach the summing amplifier 230 at the same time, since the signal from 216b will be delayed somewhat in the adaptive filter signal processor 226. The rest of the system is essentially similar to what is described above. Signal line 216b from microphone 212 is connected to adaptive filter signal processor 226. The electrical signal from the output terminal 227 of processor 226, which basically represents the filtered intelligible pattern, is directed into signal line 228, whereupon it is split into two identical signals ($y(n)$), with one signal going to output. One such signal is connected by signal line 228a to one input of a summing amplifier means 230, which summing amplifier means 230 has another input to which the input signal line 216a from voice microphone 212 is connected. In the summing means 230 the intelligible signals will be canceled to thereby generate an error signal ($e(n)$) which is directed back into error input terminal 233 of adaptive processor 226 via signal line 234. Inside signal processor 226 the error signal will be compared to the reference signal via line 216b from microphone 212 to thereby influence, by programmed operation, the output of signal processor 226. Signal processor 226 will preferably use a "leaky", i.e. it will go to small values quickly, least means square (LMS) algorithm, which will decrease the system weights by a fractional amount during each cycle of operation before they are adjusted. The weights are adjusted by the standard LMS algorithm in accordance with the relationship $W(n)new=W(n)old+(adapt\ speed)(amplitude\ of\ x(n))\ (Amplitude\ of\ e(n))$; wherein $W(n)new$=the next value of the weight being calculated by the algorithm and $W(n)$=the old value. The adapt speed is the speed at which the system converges.

This weight adjustment minimizes the error signal, $e(n)$. To implement the leaky LMS algorithm, the weights are also adjusted in accordance with the relationship $W(n)new=W(n)old-(W(n)old/2^k)$ where $k=0,1,2\ldots n$ number of bits in the digital sample of the electrical signal.

Other algorithms may also be used. For example, a fixed or variable magnitude may be subtracted to achieve the same result.

For the condition where the voice signal is somewhat louder than the background noise, the system can be used to transmit the voice while canceling the background noise. This occurs as follows; In an ideal system with no leakage, all of the input signal 216 would be canceled and would appear as output [y(n)] 228b, and e(n) would be 0. With leakage, a higher voltage signal 216 representing, for example, a voice input is coherent (correlated between both sides of the circuit) and appears as output y(n). In this case e(n) would be zero. On the other hand, a lower voltage signal 216 representing the background noise is rapidly reduced to zero because of the leakage. Hence, in this way the system of FIG. 3 separates the voice and background noise so that the voice (or other input signal) is transmitted as output y(n) of the signal. If the signal energy of x(n) is small (as is the noise floor heard between words and sentences or during periods of silence), the weights take a much longer time period to adapt to the correct filter to minimize e(n) (because of the size of the term (amplitude of x(n) in the standard LMS equation). If leakage is added, the weights will not get the chance to adapt to the lower level signals because the weights (and therefore the filter) will consequently be quickly reduced to zero. Hence the electrical signal representing the background noise, since it is smaller than the voice signal, will not appear in y(n) for transmission. If the signal energy of x(n) is large, such as for voices, the filter will form quickly because of the size of the term (amplitude of x(n)) in the standard LMS equation and, hence, the signal representing the voice will appear in y(n) and be transmitted.

The concepts of the present invention are applicable to both analog and digital signals. The processes of signal separation may be enhanced, if necessary or desirable, by adding a delay line either in series or in parallel with the electronic signal processing system, with the signals thereby being slightly delayed, but with there correspondingly being a gain of more time for signal processing and therefore for separating complex or wideband signals. As the signal processing can be made very quickly the time delays would be very small, i.e., generally less than about one second.

It is clear that many kinds of transducers may be used besides microphones. When suitable, accelerometers, velocity pickups, strain gauges, piezo-electric materials, antennae (as already described), etc. may be used to advantage.

The forgoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A sound separating system for separating intelligible sound from unwanted noise wherein both said noise and said intelligible sound are present in an acoustical field into which said intelligible sound is provided from a source located within said acoustical field, said system comprising,
   at least two sensing means positioned within said acoustical field for picking up said intelligible sound together with said unwanted noise and generating an output signal representative thereof, said at least two sensing means each placed where the intelligible signal is coherent and correlated at every sensing means relative to the source and the unwanted noise is not coherent;
   signal processing means for separating said intelligible sound from said random noise, and receiving as input a data input signal and a feedback error input signal, the output of one of said sensing means being said data input signal, and for generating an output signal which is computed according to a suitable algorithm, with said output signal from said signal processing means being representative of said intelligible sound separated from said unwanted noise and being split into two identical signals, with the first of said two identical signals being fed to an audio reproducing system;
   summing means receiving as input the output signal of a different sensing means, which is converted therein into an intelligible signal, and the second of said two identical output signals from said signal processing means, and for generating an output signal representative of the random noise portion of the output signal from said different sensing means, which output signal is fed to said signal processing means as said feedback error input signal, said feedback error input signal being used by said signal processing means for adjusting said output signal from said signal processing means to better effect the separation of said intelligible sound from said random noise.

2. The system of claim 1 wherein at least one of said sensing means is comprised of an array of microphones.

3. The system of claim 1 wherein said summing means is a summing amplifier.

4. The system of claim 1 wherein the suitable algorithm is a modified deterministic algorithm.

5. The system of claim 1 wherein said at least two sensing means comprises a first and second sensing means.

6. The system of claim 5 wherein said first and second sensing means are no more than about 4 inches apart from one another.

7. The system of claim 5 wherein said first and second sensing means are voice microphones.

8. The system of claim 7 wherein the voice microphones are voice microphones for cellular phones.

9. A sound separating system for separating intelligible sound from unwanted noise wherein both said noise and said intelligible sound are present in an acoustical field into which said intelligible sound is provided from a source located within said acoustical field, said system comprising:
   a sensing means positioned within said acoustical field for picking up said intelligible sound together with said unwanted noise and generating an output signal representative thereof, said sensing means being placed where the intelligible signal is coherent and the unwanted noise is not coherent;
   signal splitting means for splitting the output signal of said sensing means into at least two identical sensing means signals;
   signal processing means for separating said intelligible sound from said random noise, and receiving as input a data input signal and a feedback error input signal, with a first one of said at least two identical sensing means signals derived from said split output signal of said sensing means being said data input signal, and for generating an output signal which is computed according to a suitable algorithm, with said output signal from said signal processing means being representative of said intelligible sound separated from said unwanted noise;
   means to split said signal processing means output signal into two signals;

an audio reproducing system into which one of said two signals from said signal processing means output signal is fed;

summing means receiving as input another of said at least two identical sensing means signals derived from said split output signal of said sensing means and the other of said two signals from said signal processing means, and for generating an output signal representative of the unwanted noise portion of the second signal, which output signal is fed to said signal processing means as said feedback error signal input signal, said feedback error input signal being used by said signal processing means for adjusting said signal processing means output signal to better effect the separation of said intelligible sound from said random noise.

10. The system of claim 9 wherein the output signal of said sensing means is split into two identical sensing means signals.

11. The system of claim 9 wherein said sensing means is a voice microphones.

12. The system of claim 9 wherein said sensing means is comprised of an array of microphones.

13. The system of claim 9 wherein said summing means is a summing amplifier.

14. The system of claim 9 wherein the suitable algorithm is a modified deterministic algorithm.

* * * * *